United States Patent [19]

Ise et al.

[11] Patent Number: 5,576,884
[45] Date of Patent: Nov. 19, 1996

[54] BASE BODY OF REFLECTING MIRROR AND METHOD FOR PREPARING THE SAME

[75] Inventors: Yoshiaki Ise; Hiroyuki Miyazawa, both of Takefu; Hiroyuki Kimura, Fukui; Shinichi Okoshi, Takefu; Tatsumasa Nakamura, Omiya; Toshiyuki Kato, Kooriyama, all of Japan

[73] Assignee: Shin-Etsu Quartz Co., Ltd., Tokyo, Japan

[21] Appl. No.: 458,672

[22] Filed: Jun. 2, 1995

Related U.S. Application Data

[62] Division of Ser. No. 775,095, Oct. 11, 1991.

[30] Foreign Application Priority Data

Mar. 30, 1991  [JP]  Japan ..................................... 3-93212
May 30, 1991  [JP]  Japan ..................................... 3-155593

[51] Int. Cl.⁶ ............................. G02B 5/08; G02B 7/182; C03B 23/20; C03B 23/00
[52] U.S. Cl. ......................... 359/514; 359/846; 359/848; 359/883; 359/900; 428/312.6; 65/36; 65/54
[58] Field of Search ................................... 359/514, 845, 359/846, 847, 848, 883, 900; 428/314.4, 314.8, 315.5, 312.6, 304.4; 501/80, 133; 65/36, 54, 55

[56] References Cited

U.S. PATENT DOCUMENTS

| | | | |
|---|---|---|---|
| 1,532,002 | 3/1925 | Thomson | 359/848 |
| 2,890,127 | 6/1959 | Ford. | |
| 3,485,687 | 12/1969 | Chapman et al. | 501/80 |
| 3,717,486 | 2/1973 | Fukumoto et al. | 501/80 |
| 3,781,527 | 12/1973 | Tymzcak. | |
| 3,949,030 | 4/1976 | Murata. | |
| 3,950,175 | 4/1976 | Lachman et al. | |
| 4,033,780 | 7/1977 | Brumgartner et al. | 501/133 |
| 4,035,065 | 7/1977 | Fletcher et al. | 350/310 |
| 4,118,450 | 10/1978 | Nakamura et al. | |
| 4,331,383 | 5/1982 | Christiansen | 359/848 |
| 4,364,763 | 12/1982 | Rennerfelt | 65/22 |
| 4,422,893 | 12/1983 | Duchateau et al. | 156/232 |
| 4,451,119 | 5/1984 | Meyers et al. | 359/883 |
| 4,466,700 | 8/1984 | Christiansen et al. | 359/848 |
| 4,670,338 | 6/1987 | Clemino | 428/312.6 |
| 4,856,887 | 8/1989 | Wakugawa et al. | 359/883 |
| 4,875,766 | 10/1989 | Shimodaika et al. | 359/883 |
| 5,002,378 | 3/1991 | Colarusso et al. | 359/845 |
| 5,316,564 | 5/1994 | Nakamura et al. | 65/36 |
| 5,461,511 | 10/1995 | Nakamura et al. | 359/848 |

FOREIGN PATENT DOCUMENTS

| | | | |
|---|---|---|---|
| 352375 | 7/1931 | United Kingdom | 358/883 |
| 0968025 | 8/1964 | United Kingdom | 359/846 |

OTHER PUBLICATIONS

Zito, "A Method of Making Ultralight Primary Mirrors", SPIE vol. 1494, *Space Astronomical Telescopes and Instruments* (1991) pp. 491–497.

Primary Examiner—Ricky D. Shafer
Attorney, Agent, or Firm—Wenderoth, Lind & Ponack

[57] ABSTRACT

A light-weight base body of a reflecting mirror, such as those used in reflecting astronomical telescopes, is proposed which is made from fused silica glass or high-silica glass and is advantageous in respect of the excellent thermal and mechanical stability in dimensions to ensure high performance of the reflecting mirror. The base body is composed of a front plate, i.e. a surface plate to provide the optical surface, and a supporting body of porous foamed glass integrally bonded to the front plate. These two parts of the base body can be bonded together by sandwiching a layer of a finely divided silica powder therebetween and heating the assemblage at a temperature higher than the softening point of the silica powder so that the silica powder is softened or melted to firmly join the two parts sandwiching the powder layer. The base body can be further improved in respect of the mechanical stability by providing a rear plate backing the porous foamed body and a reinforcing hoop-like side layer surrounding the side surface of the porous foamed body, each made from fused quartz glass or high-silica glass and bonded to the porous foamed body by utilizing melting of a layer of silica powder therebetween.

1 Claim, 1 Drawing Sheet

BASE BODY OF REFLECTING MIRROR AND METHOD FOR PREPARING THE SAME

This is a divisional application Ser. No. 07/775,095 filed Oct. 11, 1991 pending.

BACKGROUND OF THE INVENTION

The present invention relates to a base body of a reflecting mirror and a method for the preparation thereof. More particularly, the invention relates to a base body of a large-sized reflecting mirror used in reflecting astronomical telescopes and for collimation or diffusion of light beams, which is characterized by the outstandingly light weight and still is free from any adverse influences on the dimensional precision and accuracy of the mirror surface due to mechanical deformation by the weight of the body per se and changes in the ambient temperature, as well as to a method for the preparation of such a base body of a reflecting mirror.

Reflecting mirrors in the prior art used in astronomical telescopes or for collimation or diffusion of light beams are prepared by lapping and polishing a surface of a mirror base made from fused quartz glass or high-silica glass to have a surface with flatness or a specified curvature of high precision, and providing the thus polished surface of the base body with a reflecting layer of a met;al such as aluminum by the method of, for example, chemical vapor deposition at a temperature of 400° to 800° C. to give a reflecting surface. Such a reflecting mirror is used usually by being mounted on a supporting stand in a movable or rotatable fashion to facilitate taking a desired disposition. It is essential for the base body of a reflecting mirror that the base body has such physical properties that the accuracy of the mirror surface is not affected by various outer conditions such as changes in the ambient temperature to cause thermal expansion or shrinkage and changes in the disposition of the mirror to cause mechanical deformation of the base body by gravity.

When the reflecting mirror is relatively small, for example, having a diameter off 20 cm or smaller, the above mentioned requirements for the mirror base can be readily satisfied. Along with the recent trend that reflecting mirrors of larger and larger size, for example, having a diameter of 1 meter or even larger are demanded with an object to enhance the efficiency of the mirror system, the above mentioned requirements for the mirror base can be satisfied with increasing difficulties to ensure high accuracy of the reflecting surface. Namely, other than the high temperature at which the vapor deposition of the metal layer for the reflecting surface is performed, even a very slight change in the temperature of the mirror body caused by the changes in the ambient temperature and by the irradiation with high-energy light beams may cause a great thermal expansion of the base body so that the mirror surface is sometimes subject to warping or undulation resulting in a decrease in the performance of the reflecting mirror. This is the reason that the mirror base is formed from fused quartz glass or high-silica glass having an outstandingly small thermal expansion coefficient.

Besides the above mentioned thermal expansion or shrinkage, another serious problem in a large-sized reflecting mirror is the mechanical deformation of the mirror base, because a large-sized reflecting mirror naturally has a large weight, so that the mirror base is under a great influence of the gravity to cause deformation of the mirror base in different ways as the disposition of the mirror is changed by being rotated or moved on the supporting stand. Accordingly, various attempts and proposals have been made in the prior art for decreasing the body weight of a reflecting mirror by the improvement of the structure of the base body of the mirror without sacrifice in the mechanical strength as a support of the reflecting surface, to comply with the practical requirement to ensure good operability of a large-sized reflecting mirror having a glass-made mirror base.

For example, Japanese Patent Publication 63-57761 discloses a light-weight glass-made base body of a reflecting mirror for astronomical telescopes, which consists of a front plate, i.e. the surface plate for forming the reflecting surface by metal plating thereon, a rear plate or backing plate as a base for supporting the front plate and a latticework therebetween composed of a plural number or rows of pipes made From fused quartz glass. In the latticework of pipes, each pipe of the pipe rows is contacted in a cross-stitch arrangement with the two pipes in the respective adjacent rows forming contacting lines or contacting zones while the wall thickness of the pipes is smaller along the above mentioned contacting lines or zones than in the other portions of the pipe walls and the pipes are joined together into an integral latticework by welding along the contacting lines or zones. Such a complicated latticework structure of the intermediate layer between the front plate and the rear plate of the base body, however, is industrially very disadvantageous because of the very large costs for the preparation thereof. In addition, the mirror base having such a latticework structure has poor mechanical strength in the direction within the surface plane so as not to withstand the high-precision lapping and polishing works of the optical surface, before plating with a metal, to have a desired flatness or curvature of the reflecting surface.

Moreover, it is a very difficult matter to obtain the pipe elements forming the latticework having an exactly equal effective height so that the front plate after polishing supported by the latticework unavoidably retains a strain corresponding to the height difference in the pipe elements forming the latticework to cause deformation or undulation of the reflecting surface after lapse of a certain length of time. The rigidity of such a latticework is of course inherently anisotropic and differs between the directions perpendicular to and parallel with the reflecting surface, so that the reflecting mirror having such a base body can hardly be used when the mirror must take different dispositions by being rotated or moved on the supporting stand due to the poor accuracy of the reflecting surface when the disposition of the mirror is varied.

Further, Japanese Patent Publication 61-26041 discloses another light-weight glass-made base body of a reflecting mirror for astronomical telescopes. The base body of fused quartz glass also consists of a front plate, a rear plate and an interposed latticework layer therebetween integrated into a body by welding. The latticework is prepared by putting plate-formed and/or tubular lattice elements on a supporting plate to form a lattice and filling the spaces formed between or surrounded by the lattice elements with tiny pieces of the same glass susceptible to sintering followed by sintering, of this assemblage as fastened with graphite ring in a furnace under a non-oxidizing atmosphere. The thus prepared latticework is sandwiched between the front plate and the rear plate and welded together into an integral base body to be finished by polishing the surface of the front plate. Such a base body of a reflecting mirror is industrially disadvantageous and not practical due to the very lengthy and troublesome procedure of manufacture, with consequently very high costs, in addition to the problem that the front plate bonded to the latticework by welding retains substantial strains at the welded portions to greatly affect the dimensional accuracy of the reflecting surface.

SUMMARY OF THE INVENTION

The present invention accordingly has an object to provide a novel base body of a reflecting mirror having an outstandingly light weight and still having excellent stability against mechanical as well as thermal changes in its dimensions to ensure good operability and high performance of the reflecting mirror prepared by metal-plating on the polished surface of the base body, as well as to provide a method for the preparation of such a base body of a reflecting mirror.

Thus, the base body of a reflecting mirror provided by the vention is an integral body comprising:

(A) a front plate having an optically flat or curved surface made from fused quartz glass or high-silica glass; and (B) a porous foamed body of fused quartz glass or high-silica glass bonded to the surface of the front plate opposite to the optically flat or curved surface.

It is preferable that the porous foamed body bonded over the whole surface to the front plate has a bulk density in the range from 0.1 to 1.1 g/cm$^3$ and the porosity thereof mainly consists of closed cells or, more preferably, at least 15% by volume of the porosity consists of closed cells.

The above defined base body of a reflecting mirror is prepared by the method comprising the steps of:

(a) laying a front plate having an optically flat or curved surface made from fused quartz glass or high-silica glass and a porous foamed body of fused quartz glass or high-silica glass one on the other, with the surface of the front plate opposite to the optically flat or curved surface facing the porous foamed body, with an interposed layer of a finely divided silica powder therebetween; and (b) heating the assemblage of the front plate and the porous foamed body sandwiching the layer of the finely divided silica powder at a temperature higher than the softening point of the silica powder so as to integrate the front plate and the porous foamed body.

DETAILED DESCRIPTION OF THE PREFERRED EMBODIMENTS

Figure 1:
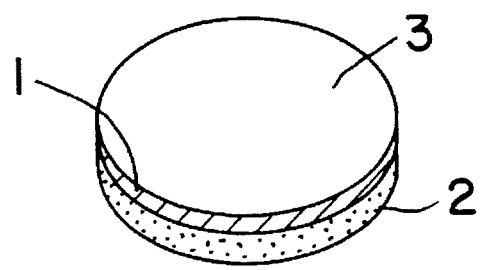
FIG. 1 is a perspective view of the base body of a reflecting mirror according to the invention, of which the optical surface of the front plate is flat.

As is described above, the essential components forming the inventive base body of a reflecting mirror include (A) a front plate having an optically flat or curved surface made from fused quartz glass or high-silica glass; and (B) a porous foamed body of fused quartz glass or high-silica glass bonded to the surface of the front plate opposite to, the optically flat or curved surface.

The front plate is a plate on which a highly reflective layer of a metal such as aluminum is formed by the method of vapor deposition to give an optical reflecting surface. Therefore, the front plate must have a surface having optical flatness or desired curvature depending on the types of the mirror which may be concave or convex having a specified focal length in compliance with the intended use of the reflecting mirror. The front plate is made preferably from transparent fused quartz glass having as high as possible purity or a purity of at least 99% by weight. When it is made from high, silica glass, the content of silicon dioxide in the high-silica glass is desirably at least 70% by weight. The thickness of the front plate naturally depends on the size of the reflecting mirror and such thickness is desirably larger in a front plate having a larger diameter in order to ensure good mechanical strength, although an excessively large thickness thereof is undesirable due to the creased weight not to meet the requirement for a light-weight so as mirror base. It is of course desirable that the glass forming the front plate is free from any bubbles and has high transparency. The thickness also depends on the thickness of the porous foamed disc body to which the front plate is bonded all over the surface. For example, the thickness of the front plate is in the range from 2% to 20% of the total thickness of the front plate and the porous foamed disc body assuming that the porous foamed body, has a form of a board or slab having two parallel surfaces with a uniform thickness.

The above described front plate of fused quartz glass or high-silica glass is bonded to a porous foamed disc body of also fused quartz glass or high-silica glass of equally high purity. The porous body should have a bulk density in the range from 0.1 to 1.1 g/cm$^3$, and at least 15% or, preferably, at least 30% or, more preferably, at least 60% of the porosity thereof is provided by closed cells. The volume fraction of the closed cells in the overall porosity of the porous body can be readily determined from the values of the bulk density, true density of silica or high-silica glass forming the matrix of the porous body and volume of the open cells determined by immersing the porous body in a liquid such as water. When the volume fraction of closed cells is sufficiently high, the closed cells may form a three-dimensional network structure which is anisotropically highly resistant against outer forces in every direction. When the bulk density of the porous body is too small, the mechanical strength of the porous body would be unduly low so that no reliable support can be provided as a base of the front plate to have the reflecting surface. When the bulk density thereof is too high, on the other hand, the body weight of the base body is naturally too large so as not to meet the requirement for decreasing the weight of a large-sized reflecting mirror. The closed cells should desirably have a diameter in the range from 0.01 mm to 3 mm. When the closed cells are too coarse, the mechanical strength of the porous body would be decreased, while a porous body formed from too fine closed cells cannot be light enough to meet the requirement for a light-weight base body. The porous foamed body is usually in the form of a disc or slab having upper and lower surfaces parallel to each other though not limitative thereto. For example, the upper surface can be inclined relative to the lower surface depending on the particular fashion of installation of the reflecting mirror in the optical instrument. When the porous foamed body is in the form of a disc or slab, the thickness of the porous foamed body is not particularly limitative but it is usual that the thickness thereof is in the range from 80% to 98% of the total thickness of the base body.

The porous foamed disc body of fused quartz glass or high silica glass can be prepared according to a procedure known in the art. For example, a powder of fused quartz glass consisting of silicon dioxide having hydroxy groups is heated in an atmosphere of ammonia to be reacted therewith followed by shaping into a desired form and sintering. Alternatively, a powder of fused quartz glass is first shaped into a form and sintered and the sintered body is then ammoniated by heating in an atmosphere of ammonia. Thereafter, the ammoniated sintered body is heated in an electric furnace at a temperature of 1500° to 1800° C. to cause softening or melting of the ammoniated silicon dioxide which is expanded by the gas evolved from the glass to give a porous foamed body of which the porosity mainly consists of closed cells. Further alternatively, a foamed porous body of glass can be prepared by heating a blend of a glass powder and a blowing agent at a temperature sufficiently high to cause decomposition of the blowing agent to evolve a gas and to cause softening of the glass powder. At any rate, it is important in these processes that the conditions of foaming should be selected so as to obtain closed cells having an adequate diameter and to prevent predominance of open cells by excessively increasing the temperature.

The porous foamed body of glass obtained in the above described manner is then cut into a desired form such as a circular disc or square or rectangular slab depending on the size and form of the reflecting mirror to be prepared therefrom. The porous foamed body of glass is bonded, on one surface, to the front plate of transparent fused quartz glass or high-silica glass to provide the optical surface. Accordingly, it is necessary that the surface of the porous foamed body is shaped to have a form capable of being contacted with the surface of the front plate opposite to the optically flat or curved surface as closely as possible so that they can fit each other over substantially their whole surfaces as completely as possible.

In the bonding work of the front plate and the porous foamed disc body as the support, they are laid one on the other with an interposed layer of a finely divided silica powder having a uniform thickness of, for example, from 1 to 3 mm formed by spreading the powder all over the surface, or in an amount of the finely divided silica powder spread over the surface in the range from 2 to 200 g/m$^2$ or, preferably, from 30 to 100 g/m$^2$. When the thickness of the silica powder layer is too small, no complete bonding can be obtained between the front plate and the porous foamed disc body while, when the thickness is too large, some decrease is caused in the bonding strength. The silica powder should have an average particle diameter as fine as possible or, preferably, not exceeding 10 µm. The silica powder should have a softening point lower than that of the porous foamed body of glass, preferably, by 50° to 100° C., or the softening point of the silica powder should be in the range from 1550° to 1800° C. or, preferably, from 1600° to 1700° C. When the, softening point is higher than that of the porous glass body, the porous foamed disc body may cause deformation or may be subject to bursting of the closed cells before the silica powder layer is softened. In this regard, silica powders having a specific surface area of at least 5 m$^2$/g or, preferably, at least 20 m$^2$/g should be used. Silica powders produced by the so-called sol-gel method are suitable. In particular, so-called fumed silica and precipitated silica fillers having a specific surface area of, for example, at least 50 m$^2$/g, which can be softened usually at 1400° to 1700° C., are quite satisfactory for this purpose.

The thus obtained assemblage of the front plate, porous foamed disc body and interposed layer of the freely divided silica powder is then mounted on a surface plate of, for example, graphite and heated at a temperature higher than the softening point of the silica powder but lower than the softening point of the porous body of glass for a length of time of from about 1 to about 4 hours under pressing by mounting a suitable weight of, for example, graphite thereon, so that the silica powder is softened or melted to act as an adhesive between the front plate and the porous body. Since the thickness of the silica powder layer is so small, it is usual that the molten silica powder is absorbed by the porous glass body so that substantially no layer of the molten silica powder as an adhesive can be found at the interface between the front plate and the porous body after the bonding treatment. It is desirable in the thus bonded interface that the effective bonding area at the cell walls is at least 5% or, preferably, at least 20% of the overall apparent bonding area, the balance being the areas of the pore spaces of the cells in the porous body.

Figure 2:
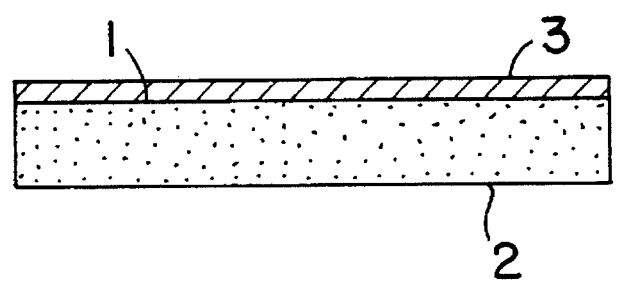
FIG. 2 is a radial cross sectional view of the same.
Figure 3:
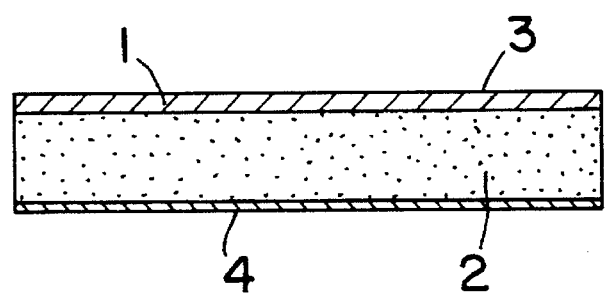
FIG. 3 is a radial cross sectional view of a base body of a reflecting mirror as another embodiment of the invention in which the base body has a rear plate integrated thereto.

The thus prepared composite body, which is illustrated in FIG. 1 by a perspective view and in FIG. 2 by a radial cross sectional view, consisting of the front plate 1 and the porous foamed disc body 2, has high mechanical strength suitable for the lapping and polishing works of the optical surface prior to plating of the optical surface with a layer 3 of a metal such as aluminum and silver to form a reflecting surface. If desired, another plate 4 of fused quartz glass or high-silica glass, called a rear plate or backing plate, can be bonded to the surface of the porous foamed disc body 2 opposite to the front plate 1 as is illustrated in FIG. 3 by a radial cross sectional view, so that the composite body can be impaled with further increased mechanical strength. The quality or purity or the fused quartz glass or high-silica glass forming the rear plate 4 need not be so high as in the front plate 1, and presence of a small number of bubbles or some opacity has no particular adverse influences. The method for bonding of the rear plate 4 to the porous foamed disc body 2 can be substantially the same as in the bonding work of the front plate 1 to the porous body 2.

Figure 4:
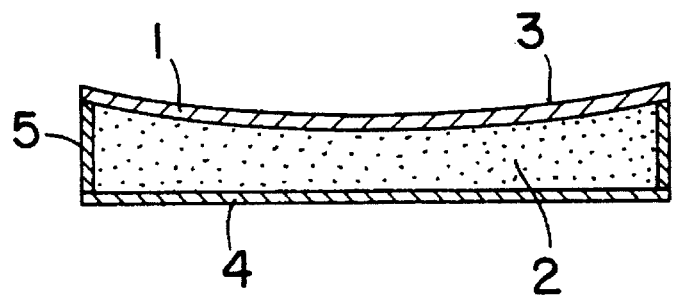
FIG. 4 is a radial cross sectional view of a base body of a reflecting mirror as a further embodiment of the invention in which the front plate has a concavely curved optical surface and the base body has a rear plate and a side-reinforcing layer of glass integrated thereto.

As is illustrated in FIG. 4 by a radial cross sectional view, the mirror base illustrated in FIG. 3 can be firther provided with a hoop-like reinforcing layer 5 having a thickness of, for example, 1 to 5 mm surrounding and bonded to the side surface of the porous foamed disc body 2. The reinforcing layer 5 is made from fused quartz glass or high-silica glass of a quality which can be about the same as that of the rear plate 4. A convenient method for providing such a hoop-like reinforcing side layer 5 is as follows. Thus, a hoop of fused quartz glass having an adequate wall thickness and diameter is prepared by radially cutting a pipe of fused quartz glass. The inner diameter of the hoop should be somewhat larger than the diameter of the porous foamed disc body to be put into the hoop before bonding so that, when the porous foamed disc body is put inside the hoop, s small gap having a width of, for example, 0.5 to 2 mm is formed around the porous foamed disc body. This annular gap is then filled with a finely divided silica powder such as that used in bonding of the front plate and rear plate to the porous foamed disc body.

The bonding works of the front plate, rear plate and hoop-like reinforcing side layer can be performed in one step. A typical procedure therefor is as follows. In the first place, the front plate is placed on a horizontal surface plate of graphite and the finely divided silica powder is spread over the front plate to form a uniform layer of the powder. Then, the porous foamed disc body is put on the layer of the silica powder and further the silica powder is spread over the surface of the porous foamed disc body to form a second silica powder layer on which the rear plate is mounted. Then, the reinforcing hoop is put to surround the porous foamed disc body. The gap formed between the porous foamed disc body and the hoop is filled with the silica powder. After mounting a graphite weight on the rear plate, the assemblage is introduced into a furnace and heated there at a temperature to cause softening of the powder layers so that the four parts, i.e. the porous foamed disc body, front plate, rear plate and reinforcing hoop, are integrated into a base body of a reflecting mirror. It is usual that a decrease is caused in the thickness of the porous foamed disc body heated under a graphite weight so that the width of the reinforcing hoop should be somewhat smaller than the thickness of the porous foamed body before heating under the graphite weight.

In the following, the present invention is illustrated in more detail by way of examples and comparative examples.

EXAMPLE 1

A carbon mold was filled with a finely pulverized silica powder of 98% purity containing about 300 ppm of hydroxy groups and having a particle diameter not to exceed 100 µm. The powder was heated at about 1400° C. for 1 hour to prepare a sintered body which was then heated in an atmosphere of ammonia gas at 800° C. for 6 hours to effect the ammoniation reaction, and then heated at 1500° C. for 2 hours so that the sintered body was softened and expanded by the gas evolved therefrom to give a porous foamed body of fused quartz glass having a bulk density of about 0.4 g/cm$^3$. The volume fraction of closed cells in the overall porosity was about 61%. The closed cells had diameters ranging from 0.08 to 0.8 mm. The porous foamed body thus obtained was cut and shaped into a disc having a diameter of 500 mm and a thickness of 8 mm.

The thus prepared porous foamed disc body having flat surfaces was mounted on a fused quartz glass plate having a diameter of 500 mm and a thickness of 0.5 mm as a rear plate put on a surface plate of graphite. A layer of a finely divided silica powder was interposed between the porous disc body and the rear plate. This powder layer was formed by spreading a fumed silica filler having a specific surface area of about 50 m$^2$/g (Aerosil 50, a product by Nippon Aerosil Co.) all over the surface, and the layer had a thickness of about 1 mm after gentle stamping. Further, another plate of high-quality, transparent fused quartz glass as a front plate was mounted on the porous disc body also with an interposed powder layer of the same fumed silica filler in a thickness of about 1 mm after gentle stamping. The amount of the silica powder spread over the surface was 80 g per m$^2$ of the surface. The thus prepared assemblage of the rear plate, porous foamed disc body and front plate on the surface plate with interposed layers of the silica filler was heated under a load of a graphite-made weight of about 12 kg at a temperature of about 1400° C. for 50 minutes so that the rear plate, porous foamed disc body and front plate were bonded together an integral base body having a thickness of 9 mm and a diameter of 500 mm.

The base body obtained in the above described manner was evaluated for mechanical strength and stability by the testing procedures described below.
Test 1:

The base body was mounted on a horizontal surface plate with the front plate facing upwardly and a weight of 500 kg was placed on the central circular zone of 50 cm$^2$ area and kept as such for 3 minutes at room temperature to measure the depression at the center of the body under weight and the residual depression after the weight was removed. The results were that the depression at the center under load was 0.4 µm and substantially no residual strain was found after removal of the 500 kg weight.
Test 2:

The base body was horizontally supported at two radially opposite points and kept at room temperature without mounting a weight to measure the depression of the plate at the center by the body weight of the plate per se. The result was that the depression at the center was 1 µm.
Test 3:

The base body was horizontally supported in the same manner as in Test 2 and an increasing weight was mounted on the central circular zone of 3 cm$^2$ area to record the relationship between the weight added and depression of the plate at the center as well as the weight when the plate was broken. The result was that the depression at the center of the plate was 0.1 mm, 0.2 mm, 0.4 mm and 2 mm under the load of 0.1 kg, 0.5 kg, 1.0 kg and 5.0 kg, respectively. As a rough standard, a plate capable of withstanding a weight of 1.0 kg in this test would be acceptable for practical use of the reflecting mirror of 500 mm diameter.

EXAMPLE 2

The experimental procedure was substantially the same as in Example 1 except that expansion of the ammoniated and sintered body of the fused quartz glass powder was performed at 1600° C. instead of 1500° C. The thus obtained porous foamed body had a bulk density of about 0.1 g/cm$^3$ and about 75% by volume of the porosity was provided by closed cells having diameters in the range from 0.08 to 1.0 mm.

The results of the tests undertaken in the same manner as in Example 1 were that the depression at the center of the base body was 0.8 µm under the 500 kg weight and the residual depression after removal of the weight was 0.1 µm in Test 1 and the depression of the front plate at the center was 1.5 µm in Test 2. The result of Test 3 was that the depression of the plate at the center was 0.1 mm, 0.3 mm and 0.6 mm under the load of 0.1 kg, 0.5 kg and 1.0 kg, respectively, and cracks were formed in the plate by mounting a weight of 5.0 kg.

EXAMPLE 3

The experimental procedure was substantially the same as in Example 1 except that expansion of the ammoniated and sintered body of the fused quartz glass powder was performed at 1450° C. instead of 1500° C. The thus obtained porous foamed body had a bulk density of about 0.9 g/cm$^3$ and about 60% by volume of the porosity was provided by closed cells having diameters in the range from 0.01 to 0.8 mm.

The results of the tests undertaken in the same manner as in Example 1 were that the depression at the center of the base body was 0.1 µm under the 500 kg weight and substantially no residual depression was found after removal of the weight in Test 1 and the depression of the front plate at the center was 2 µm in Test 2.

Comparative Example 1

The experimental procedure was substantially the same as in Example 1 except that expansion of the ammoniated and sintered body of the fused quartz glass powder was performed at 1700° C. instead of 1500° C. The thus obtained porous foamed body had a bulk density of about 0.05 g/cm$^3$ and about 68% by volume of the porosity was provided by closed cells having diameters in the range from 0.08 to 3.0 mm.

The results of the tests undertaken in the same manner as in Example 1 were that the depression at the center of the base body was 2.2 µm under the 500 kg weight and the residual depression after removal of the weight was 1.2 µm in Test 1 and the depression of the front plate at the center was 0.8 µm in Test 2.

Comparative Example 2

The experimental procedure was substantially the same as in Example 1 except that expansion of the ammoniated and sintered body of the fused quartz glass powder was performed at 1400° C. for 3 hours instead of 1500° C. for 2 hours. The thus obtained porous foamed body had a bulk density of about 1.2 g/cm$^3$ and about 72% by volume of the porosity was provided by closed cells having diameters in the range from 0.1 to 0.6 mm.

The results of the tests undertaken in the same manner as in Example 1 were that the depression at the center of the base body was 0.1 µm under the 500 kg weight and substantially no residual depression was found after removal of the weight in Test 1 and the depression of the front plate at the center was 10 µm in Test 2.

EXAMPLE 4

The experimental procedure was substantially the same as in Example 1 except that expansion of the ammoniated and sintered body of the fused quartz glass powder was performed at 1510° C. for 12 hours instead of 1500° C. for 2 hours. The thus obtained porous foamed body had a bulk density of about 0.8 g/cm$^3$ and about 30% by volume of the porosity was provided by closed cells having diameters in the range from 0.08 to 6.0 mm.

The results of Test 3 were that the depression of the plate at the center was 0.1 mm, 0.5 mm and 2.0 mm under the load of 0.1 kg, 0.5 kg and 1.0 kg, respectively, and the plate was broken by mounting a weight of 5.0 kg.

EXAMPLE 5

The procedure for the preparation of a porous foamed body of fused quartz glass was substantially the same as in Example 1 except that the sintering temperature of the fused quartz glass powder in the carbon mold was 1100° C. and the sintered and ammoniated silica body was expanded by heating at about 1800° C. for about 10 minutes to give a porous foamed body of fused quartz glass having a bulk density of 0.12 g/cm$^3$ of which the volume fraction of closed cells was 16% in the overall porosity and the closed cells had diameters ranging from 0.1 to 3.0 mm.

The thus prepared porous body was cut and shaped into a disc having a diameter of 1000 mm and a thickness of 49 mm and bonded to a front plate having a diameter of 1000 mm and a thickness of 3 mm in the same manner as in Example 1 except that the temperature of the bonding work was about 1600° C. instead of 1300° C. to give a base body of a reflecting mirror. The surface of the front plate was ground and polished so that the finished front plate having an optically flat surface had a thickness of 1 mm. Thereafter, aluminum was deposited on the thus obtained optical surface by the method of chemical vapor deposition to give a reflecting mirror which had a diameter of 1000 mm and a thickness of 50 mm. The thus finished base body before deposition of aluminum on the optical surface had excellent appearance without noticeable defects. The weight of the thus prepared base body was only about 6% of that of a mirror base having the same dimensions but entirely formed from fused quartz glass without porosity.

EXAMPLE 6

The procedure for the preparation of a base body of a flat reflecting mirror was substantially the same as in Example 5 except that the sintered and ammoniated body of fused quartz glass powder was expanded at a temperature of 1700° C. for 15 minutes instead of 1800° C. for 10 minutes so that the porous foamed body of fused quartz glass had a bulk density of 0.98 g/cm$^3$ of which the volume fraction of closed cells was 16% of the overall porosity and the closed cells had diameters ranging from 0.1 to 2.0 mm. The appearance of the thus prepared base body after polishing of the optical surface had appearance as good as in Example 5.

EXAMPLE 7

The procedure for the preparation of a porous foamed body of fused quartz glass was substantially the same as in Example 5 except that the sintering temperature of the fused quartz glass powder was 1300° C. and the sintered and ammoniated body was expanded at a temperature of 1720° C. for 10 minutes instead of 1800° C. for 10 minutes so that the porous foamed body of fused quartz glass had a bulk density of 0.8 g/cm$^3$ of which the volume fraction of closed cells was 60% of the overall porosity and the closed cells had diameters ranging from 0.02 to 1.0 mm.

The thus obtained porous body was cut and shaped into a disc having a diameter of 1000 mm and a thickness of 40 mm and bonded to a front plate having a thickness of 12 mm in the same manner as in Example 5 to give a base body of a reflecting mirror which was subjected to grinding and polishing of the surface of the front plate followed by deposition of aluminum so that the front plate of the finished reflecting mirror had a thickness of 10 mm.

EXAMPLE 8

The procedure was substantially the same as in Example 5 except that the front plate bonded to the porous foamed disc body had a thickness smaller by 1 mm than in Example 5 and a 1.0 mm thick plate of miry white fused quartz glass having a density of 2.2 g/cm$^3$ was bonded to the other surface of the porous foamed disc body as a rear plate in the same manner as in Example 1. The finished reflecting mirror had the same diameter and thickness as in Example 5. The weight of the thus prepared base body was only about 8% of that of a mirror base having the same dimensions but entirely formed from fused quartz glass without porosity.

Comparative Example 3

The procedure was substantially the same as in Example 5 except that sintering temperature of the fused quartz glass powder was 1000° C. and the temperature for the expansion of the ammoniated and sintered body was 1760° C. so that the porous foamed body had a bulk density of 0.8 g/cm$^3$ of which the volume fraction of closed cells was about 10%.

The porous foamed body shaped into the form of a disc was bonded in the same manner as in Example 7 to a front plate having a thickness of 12 mm so that the front plate of the finished reflecting mirror had a thickness of 10 mm after grinding and polishing. The overall thickness of the mirror was the same as in Example 5. The base body of the reflecting mirror before deposition of aluminum layer had a defect that separation, though very slight, was found between the front plate and the porous foamed disc body.

Comparative Examples 4 and 5

The procedure for the preparation of a base body of a flat reflecting mirror was substantially the same as in Comparative Example 3 described above in each of Comparative Examples 4 and 5 except that the porous foamed disc body had a bulk density of 0.05 g/cm$^3$ and 0.1 g/cm$^3$, respectively, the volume fraction of closed cells was each 15% of the overall porosity and the front plate had a thickness of 1 mm and 0.5 mm, respectively, after finishing by grinding and polishing. The appearance of the base body in Comparative Example 4 after polishing had a defect similar to that in Comparative Example 3 and a small number of tiny cracks were found in the front plate in the base body of Comparative Example 5 after finishing by polishing.

The reflecting mirrors prepared in Examples 5 to 8 and Comparative Examples 3 and 4 were each subjected to the test of warping or undulation of the optical surface by the body weight when the mirror was horizontally supported at three symmetrical positions around the periphery to determine the root mean square (RMS) roughness and the maximum height in the roughness curve (Rt) in the vertical and horizontal directions. The results of the measurement are shown in Table 1 below in the unit of λ, which was the wavelength 633 nm of the light used in the measurement of the optical interference. The table also includes the data obtained with a reflecting mirror as a control having a honeycomb structure by sandwiching a latticework formed from fused quartz glass pipes having a length of 46 mm, outer diameter of 40 mm and wall thickness of 2 mm in a closed-packing arrangement between two fused quartz glass plates each having a thickness of 2 mm by welding into an integral body. The weight of this control base body was 22% of that of a mirror base having the same dimensions but entirely formed from fused quartz glass without porosity.

TABLE 1

| | Vertical direction | | Horizontal direction | |
| --- | --- | --- | --- | --- |
| | RMS | Rt | RMS | Rt |
| Example 5 | 0.06 | 0.24 | 0.07 | 0.28 |
| Example 6 | 0.02 | 0.18 | 0.06 | 0.30 |
| Example 7 | 0.03 | 0.11 | 0.04 | 0.28 |
| Example 8 | 0.03 | 0.12 | 0.04 | 0.20 |
| Comparative Example 3 | 0.03 | 0.14 | 0.14 | 0.92 |
| Comparative Example 4 | 0.09 | 0.82 | 0.66 | 3.55 |
| Control | 0.07 | 0.25 | 0.12 | 0.66 |

EXAMPLE 9

Silicon tetrachloride was subjected to flame hydrolysis in an oxyhydrogen flame by the chemical vapor deposition method to produce silica soot and a sintered body prepared therefrom was ammoniated by heating in an atmosphere of ammonia at 800° C. The thus obtained sintered and ammoniated body of silica was heated at 1650° C. under a reduced pressure of 0.1 Torr for 3 hours so that the silica body was softened and expanded by the gas evolved therefrom into a porous foamed body of fused silica glass having a bulk density of 0.19 g/cm$^3$, of which the volume fraction of closed cells was about 82% of the overall porosity. The closed cells had diameters in the range from 0.05 to 1.2 mm. The porous foamed body of fused silica glass was cut and shaped into a disc having a diameter of 506 mm and a thickness of 52 mm.

A plate of high-purity transparent fused quartz glass having a diameter of 500 mm and a thickness of 3 mm to serve as a front plate was mounted on the porous foamed disc body after spreading the same finely divided silica powder as used in Example 1 in an amount of 100 g/m$^2$ to form a uniform layer of the powder and a graphite plate of 20 kg weight was further mounted thereon. The assemblage was introduced into a furnace and heated at 1400° C. for about 1 hour under a reduced pressure of 0.1 Torr so that the silica powder of the interposed layer was softened and the porous foamed disc body and the front plate were firmly bonded together into an integral base body. The density of the porous foamed disc body in the thus prepared base body had been slightly increased to about 0.20 g/cm$^3$ due to compression in the heating process at 1400° C. This base body was finished by grinding the side surface and grinding and polishing the surface of the front plate into a mirror base having a diameter of 500 mm and a thickness of 50 mm of which the thickness of the front plate was 1 mm.

The mirror base prepared in the above described manner was subjected to the measurement of the peak-and-valley height deviation using an optical interferometer by holding the same to have the optical surface in a horizontal and vertical dispositions. The results are shown in Table 2 below in the unit of λ which was the wavelength 633 nm of the light used in the interference measurement.

EXAMPLE 10

A sintered body of silica soot prepared from silicon tetrachloride by the chemical vapor deposition method was ammoniated by heating at 800° C. in ammonia and then subjected to expansion by heating at 1650° C. for 3 hours under a reduced presage of 0.1 Torr to give a porous foamed body of fused silica glass having a bulk density of 0.19 g/cm$^3$ and the volume fraction of closed cells in the overall porosity was about 70%. The closed cells had diameters in the range from 0.05 to 1.3 mm. This porous foamed body of fused silica glass was cut and shaped into a disc having a thickness of 52 mm and a diameter of 497 mm.

The porous foamed disc body was put into a circular hoop of fused quartz glass having an outer diameter of 504 mm, width of 48 mm and thickness of 3 mm and the porous disc body was sandwiched between two circular plates of fused quartz glass to serve, one, as a front plate and, the other, as a rear plate each having a diameter of 502 mm and a thickness of 3 mm by interposing a layer of the same finely divided silica powder as used in Example 1 between each surface of the porous disc body and the glass plate in an amount of 100 g/m$^2$. The gap formed between the hoop and the porous disc body was filled with the same silica powder. This assemblage was mounted on a surface plate of graphite in an electric furnace and pressed by mounting thereon a graphite block of 20 kg weight to be heated in the furnace at 1400° C. for 1 hour under a reduced pressure of 0.1 Torr so that the four parts were bonded together into an integral base body. The thickness of the porous foamed disc body in the thus prepared base body had been decreased to 48 mm and the density thereof had been slightly increased to about 0.20 g/cm$^3$ due to compression in the heating process at 1400° C.

This base body was finished by grinding the side surface and grinding and polishing the surface of the front plate into a mirror base having a diameter of 500 mm and a thickness of 50 mm of which the thickness of each of the front plate and rear plate was 1

The mirror base prepared in the above described manner was subjected to the measurement of the peak-and-valley height deviation in the same manner as in Example 9 to give the results shown in Table 2 below.

EXAMPLE 11

A porous foamed body of fused silica glass, of which the bulk density was 0.57 g/cm$^3$ and the volume fraction of the closed cells having diameters of 0.02 to 0.8 mm was about 82% in the overall porosity, was prepared in a manner similar to Example 10. The porous foamed body was cut and shaped into a disc having a diameter of 497 mm and thickness of 52 mm. This porous foamed disc body was bonded to two plates and reinforcing hoop of fused quartz glass in the same manner as in example 10 to give a base body of a reflecting mirror. The thickness of the porous foamed disc body in the thus prepared base body had been decreased to 48 mm and the density thereof had been slightly increased to about 0.60 g/cm$^3$ due to compression in the heating process at 1400° C.

This base body was finished by grinding the side surface and grinding and polishing the surface of the front plate into a mirror base having a diameter of 500 mm and a thickness of 50 mm of which the thickness of each of the front plate and rear plate was 1 mm. This mirror base was subjected to the same measurements of the peak-and-valley height deviation in the same manner as in Example 9 to give the results shown in Table 2.

Comparative Example 6

A porous foamed body of fused silica glass was prepared in substantially the same manner as in Example 10 except that expansion of the sintered and ammoniated body of silica soot was conducted at 1750° C. for 1 hour. The porous body had a bulk density of 0.045 g/cm$^3$ and the volume fraction of closed cells having diameters of 0.1 to 6.0 mm was 14% in the overall porosity.

This porous foamed body of fused silica glass was cut and shaped into a disc of 497 mm diameter and 52 mm thickness which was bonded together with two plates of fused quartz glass and a reinforcing hoop in the same manner as in Example 10 into an integral base body except that the graphite weight of 20 kg was replaced with that of 8 kg and heating at 1400° C. in an electric furnace was performed for 30 minutes instead of 1 hour. The thickness of the porous foamed disc body in the thus prepared base body had been decreased to 48 mm and the density thereof had ben slightly increased to about 0.050 g/cm$^3$ due to compression in the heating process at 1400° C.

This base body was finished by grinding the side surface and grinding and polishing the surface off the front plate into a mirror base having a diameter of 500 mm and a thickness of 50 mm of which the thickness of each of the front plate and rear plate was 1 mm. This mirror base was subjected to the same measurements of the peak-and-valley height deviation in the same manner as in Example 9 to give the results shown in Table 2.

TABLE 2

|  | Vertical disposition | Horizontal disposition |
| --- | --- | --- |
| Example 9 | 0.15 λ | 0.26 λ |
| Example 10 | 0.12 λ | 0.17 λ |
| Example 11 | 0.10 λ | 0.15 λ |
| Comparative Example 5 | 0.50 λ | 0.95 λ |

What is claimed is:

1. A method for the preparation of a base body of a reflecting mirror comprising (A) a front plate having an optically flat or curved surface made from transparent-fused quartz glass or high-silica glass, (B) a porous foamed body of fused quartz glass or high-silica glass bonded to the surface of the front plate opposite to the optically flat or curved surface, (C) a rear plate made from fused quartz glass or high-silica glass bonded to the surface of the porous foamed body opposite to the front plate and (D) a reinforcing side layer of fused quartz glass or high-silica glass bonded to the side surface of the porous foamed body, which method comprises the steps of:

(a) sandwiching said porous foamed body of fused quartz glass or high-silica glass with two plates of fused quartz glass or high-silica glass to serve, one, as the front plate and, the other, as the rear plate with an interposed layer of a finely divided silica powder between the front plate and the porous foamed body and between the rear plate and the porous foamed body;

(b) surrounding the porous foamed body with a hoop of fused quartz glass or high-silica glass keeping a gap between the hoop and the side surface of the porous foamed body;

(c) filling the gap between the hoop and the side surface of the porous foamed body with a finely divided silica powder; and (d) heating the assemblage of the front plate, porous foamed body, rear plate and hoop with the interposed layers of a finely divided silica powder at a temperature higher than the softening point of the silica powder so as to integrate the front plate and rear plate and hoop with the porous foamed body.

\* \* \* \* \*